(12) United States Patent
Jung et al.

(10) Patent No.: US 8,942,149 B2
(45) Date of Patent: Jan. 27, 2015

(54) METHOD AND APPARATUS FOR TRANSMITTING A BROADCASTING SERVICE IN A SYSTEM THAT SUPPORTS MACHINE TO MACHINE COMMUNICATIONS

(75) Inventors: Inuk Jung, Anyang-si (KR); Kiseon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 214 days.

(21) Appl. No.: 13/639,498

(22) PCT Filed: Apr. 5, 2011

(86) PCT No.: PCT/KR2011/002387
§ 371 (c)(1),
(2), (4) Date: Oct. 4, 2012

(87) PCT Pub. No.: WO2011/126286
PCT Pub. Date: Oct. 13, 2011

(65) Prior Publication Data
US 2013/0022018 A1 Jan. 24, 2013

Related U.S. Application Data

(60) Provisional application No. 61/321,121, filed on Apr. 5, 2010.

(51) Int. Cl.
*H04B 7/00* (2006.01)
*H04W 4/06* (2009.01)
*H04W 4/00* (2009.01)
*H04W 72/00* (2009.01)
*H04W 4/22* (2009.01)

(52) U.S. Cl.
CPC ............... *H04W 4/06* (2013.01); *H04W 4/005* (2013.01); *H04W 72/005* (2013.01); *H04W 4/22* (2013.01)

USPC .......................... 370/310; 370/431; 370/522

(58) Field of Classification Search
None
See application file for complete search history.

(56) References Cited

U.S. PATENT DOCUMENTS

| 8,300,560 B2* | 10/2012 | Nowlan et al. ............... 370/270 |
| 2003/0022683 A1 | 1/2003 | Beckmann et al. |
| 2004/0137915 A1* | 7/2004 | Diener et al. ............. 455/456.1 |
| 2005/0090242 A1* | 4/2005 | Kotzin et al. ............ 455/422.1 |
| 2008/0009262 A1 | 1/2008 | Rudolf et al. |
| 2008/0273513 A1* | 11/2008 | Montojo et al. ............. 370/342 |
| 2010/0189048 A1* | 7/2010 | Baker et al. ................. 370/329 |
| 2013/0115996 A1* | 5/2013 | Shatsky ...................... 455/518 |

FOREIGN PATENT DOCUMENTS

| KR | 10-2002-0006633 | 1/2002 |
| KR | 10-2008-0018566 | 2/2008 |
| KR | 10-2009-0058576 | 6/2009 |

* cited by examiner

*Primary Examiner* — Kevin C Harper
(74) *Attorney, Agent, or Firm* — Lee, Hong, Degerman, Kang & Waimey

(57) ABSTRACT

The present invention relates to a method for transmitting a broadcasting service in a system that supports machine to machine communications, the method comprising: transmitting an event registration message to a base station for the registration of an event at the time of occurrence; receiving from the base station an event registration response that contains information on a reserved downlink resource area in the base station to transmit the vent occurrence to other terminals; and broadcasting the event occurrence to the other terminals via the reserved downlink resource area.

12 Claims, 3 Drawing Sheets

METHOD AND APPARATUS FOR TRANSMITTING A BROADCASTING SERVICE IN A SYSTEM THAT SUPPORTS MACHINE TO MACHINE COMMUNICATIONS

CROSS-REFERENCE TO RELATED APPLICATIONS

This application is the National Stage filing under 35 U.S.C. 371 of International Application No. PCT/KR2011/002387, filed on Apr. 5, 2011, which claims the benefit of U.S. Provisional Application Ser. No. 61/321,121, filed on Apr. 5, 2010, the contents of which are all hereby incorporated by reference herein in their entirety.

TECHNICAL FIELD

The present invention relates to a system supportive of machine-to-machine communications, and more particularly, to a method and apparatus for a mobile station to transmit a broadcast service to other mobile stations.

BACKGROUND ART

In a system supportive of machine-to-machine communications according to a related art, in case that an emergency or a specific event occurs in a mobile station, a detailed scenario of a method for the mobile station to inform other mobile stations of the emergency or event occurring in the mobile station has not been provided.

DISCLOSURE OF THE INVENTION

Technical Task

An object of the present invention is provide a method for a mobile station to broadcast an emergency or specific event having occurred in the corresponding mobile station to other neighboring mobile stations in a system supportive of machine-to-machine communications.

Technical Solution

To achieve these and other advantages and in accordance with the purpose of the present invention, as embodied and broadly described, a method of transmitting a broadcast service in a system supportive of M2M (machine to machine) communication may include the steps of sending an event registration message for an event occurrence registration to a base station, receiving an event registration response message including an information on a DL resource region reserved by the base station from the base station to enable an event occurrence to be transmitted to other mobile stations, and broadcasting the event occurrence to the other mobile stations via the reserved DL resource region.

Preferably, the event registration message may include at least one selected from the group consisting of an information indicating an event type occurring in a mobile station, a DL resource allocation request information to broadcast the event occurrence to the other mobile stations, a signal strength information on a signal used to broadcast the event occurrence, and an event occurrence broadcast period information.

More preferably, the information indicating the event type may include a preamble code and the preamble code may be assigned per the event type.

Preferably, the method may further include the step of receiving a preamble code set information corresponding to each event from a network having the base station belong thereto via a broadcast message.

More preferably, the event occurrence broadcast period information may indicate to broadcast the event occurrence to the other mobile stations one time, for a certain period, or persistently.

More preferably, the method may further include the step of performing an event occurrence deregistration procedure on the base station.

More preferably, if the event occurrence broadcast period information corresponds to a persistent broadcast, the event occurrence deregistration procedure may be performed on the base station by sending an event deregistration request message to the base station.

Preferably, the broadcasting step may be performed using at least one of a preamble code, a superframe header and a MAC message.

Preferably, the reserved DL resource region information may indicate a position of a resource region allocated to broadcast the event occurrence to the other mobile stations.

More preferably, the information indicating the position of the resource region may include an index of one of a superframe, a frame and a subframe.

Preferably, if a prescribed event occurs in a mobile station, the event registration message may be sent to the base station.

More preferably, the prescribed event may include one of a car accident, a toll gate fee payment on a highway and a police check (inspection).

To further achieve these and other advantages and in accordance with the purpose of the present invention, a mobile station, which is provided for a broadcast service transmission in a system supportive of M2M (machine to machine) communication, may include a radio communication unit configured to externally transceive radio signals and a control unit connected with the radio communication unit, the control unit controlling the radio communication unit to send an event registration message for an event occurrence registration to a base station, the control unit controlling the radio communication unit to receive an event registration response message including an information on a DL resource region reserved by the base station from the base station to enable an event occurrence to be transmitted to other mobile stations, the control unit controlling the event occurrence to be broadcasted to the other mobile stations via the reserved DL resource region.

Advantageous Effects

Accordingly, in case that an emergency or a specific event occurs in a specific mobile station, the present invention broadcasts the occurrence of the emergency or the specific event to other mobile stations, thereby enabling other mobile stations to obtain the information quickly.

MODE FOR INVENTION

Figure 1:
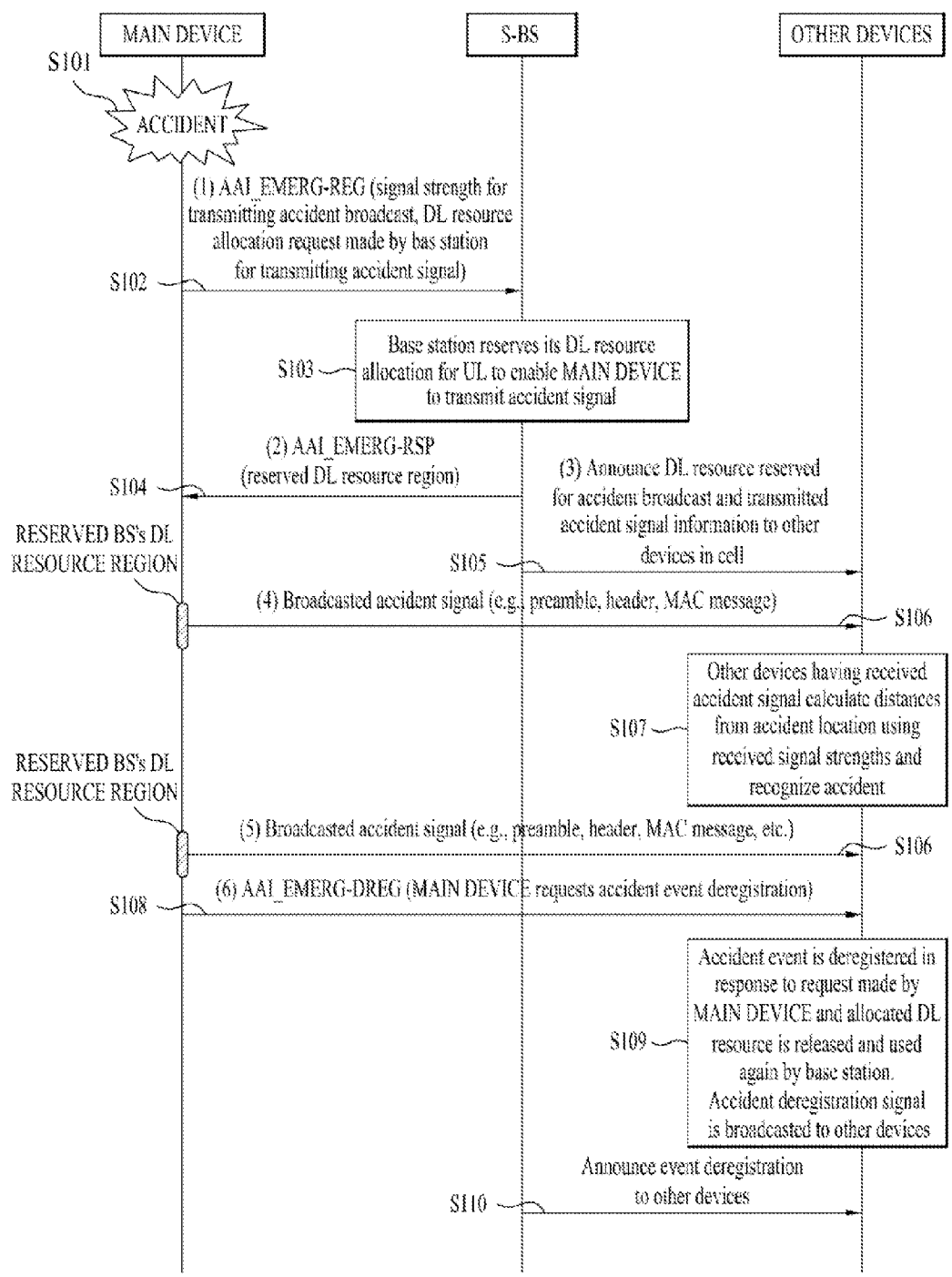
FIG. 1 is a flowchart for a method of providing a broadcast service in a system supportive of machine to machine communications according to one embodiment of the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this disclosure, embodiments of the present invention are described centering on the data transmission/reception relations between a base station and a mobile station. In particular, the base station may be meaningful as a terminal node of a network that directly communicates with the mobile station. In this disclosure, a specific operation explained as performed by a base station may be performed by an upper node of the base station in some cases.

In particular, in a network constructed with a plurality of network nodes including a base station, it is apparent that various operations performed for communication with a mobile station may be performed by a base station or other networks (e.g., relay, etc.) except the base station. In this case, 'base station' can be replaced by such a terminology as a fixed station, a Node B, an eNode B (eNB), an access point and the like. And, 'terminal' may be replaced by such a terminology as a user equipment (UE), a mobile station (MS), a mobile subscriber station (MSS)' and the like.

Embodiments of the present invention may be implemented using various means. For instance, embodiments of the present invention may be implemented using hardware, firmware, software and/or any combinations thereof.

In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

In the following description, specific terminologies used for embodiments of the present invention are provided to help the understanding of the present invention. And, the use of the specific terminology can be modified into another form within the scope of the technical idea of the present invention.

Machine to machine communication (M2M) is schematically described as follows.

First of all, the M2M means a communication between one electronic device and another electronic device as represented. In particular, the M2M means a communication between objects. Although the M2M generally means a wire/wireless communication between electronic devices or a communication between a user controllable device and a machine, it may especially mean a communication between electronic devices, i.e., a wireless communication between devices. Moreover, an M2M mobile station used on a cellular network may have performance or capability inferior to that of a general mobile station.

M2M environment may have the following features.
1. Numerous mobile stations in a cell
2. Small data size
3. Small transmission frequency number
4. Limited number of data characteristics
5. Insensitive to time delay A number of mobile stations exist in a cell. And, the mobile stations may be discriminated from each other in accordance with type, class, service type or the like. In particular, considering machine to machine (M2M) communication (or, machine type communication (MTC)), the total number of the mobile stations may increase abruptly. M2M mobile stations may have the following properties in accordance with supportive services.
1. Transmit data intermittently. In doing so, periodicity may be provided.
2. Have low mobility or fixed.
3. Insensitive to latency in signal transmission in general.

The numerous M2M mobile stations with the above-described properties are able to transceive signals in-between or with a base station using multi-hop configuration in-between or a hierarchical structure thereof.

In particular, one M2M mobile station receives a signal from a base station and then transmits data to another M2M mobile station existing in another layer or a lower layer. Alternatively, one M2M mobile station receives signals from other M2M mobile stations and then transmits the received signals to a specific M2M mobile station or the base station. Alternatively, communications may be directly performed between M2M mobile stations by excluding a relay.

For the inclusively meaningful signal transmissions between M2M mobile stations, signals can be transmitted in a manner that the respective M2M mobile stations are connected together by configuring an upper/lower structure [cf. In case of a direct communication between mobile stations, the upper/lower concept may not exist. Yet, it may be possible to describe the direct communication in a manner of applying the upper/lower concept identically.].

For instance, in aspect of downlink (DL) transmission, MS 1 receives a signal transmitted by a base station and then transmits the received signal to MS 2. In doing so, the MS 1 may be able to transmit the signal not only to the MS 2 but also to a lower mobile station MS a. In this case, the MS 2 means a mobile station below the MS 1.

Having received the signal from the MS 1, the MS 2 transmits the received signal to the lower MS. Thus, the received signal is eventually transmitted to MS N in the same manner. In doing so, a number of mobile stations may be connected between the MS2 and the MS N in a multi-hop structure or hierarchically.

For another instance, in aspect of uplink (UL) transmission, a signal may be transmitted for signal transmissions between M2M mobile stations in a following manner. First of all, a lower M2M mobile station (i.e., M2M mobile station situated in a lower position) may be able to transmit a signal to another M2M mobile station or a base station using an upper M2M mobile station (i.e., M2M mobile station situated in an upper position).

In the following description, a method of transmitting a broadcast service in a system supportive of M2M communications according to the present invention is explained.

1. Case of M2M Broadcast Service

1) A vehicle may be able to broadcast a broadcast signal on a frequency band of a base station.

2) Broadcast signals from other mobile stations are broadcasted in a DL region of a base station.

3) Broadcast signal may be transmitted in accordance with a type of a mobile station necessary to broadcast a presence of a mobile station to other neighboring mobile stations. For example, the type of the mobile station may include one of an ambulance, an accidental car, a police car and the like.

2. Scenario of M2M Broadcast Operation

1) Emergency or specific event occurs.

2) An event occurring in a mobile station (or device) registers with a base station to which the mobile station belongs.

Each mobile station having completed the event registration with the base station may make a request for a UL resource region to other neighboring mobile stations to broadcast the event occurrence.

The resource region for the broadcast may be requested to be reserved in some period of time, one time or persistently.

3) The base station reserves a DL resource region for the mobile station (e.g., a main device) to broadcast the event occurrence to other neighboring mobile stations.

In the reserved DL resource region, the base station does not transmit control information or data packet to any mobile stations. Moreover, the reserved DL resource region may not be assigned for other mobile stations in some period of time, one time or persistently.

4) If the event occurring mobile station confirms that the UL resource region is reserved (i.e., this means the reserved DL resource region of the base station), The mobile station broadcasts the event occurrence to other neighboring mobile stations via the reserved UL resource region.

3. Definition of Event (1) Various types of occurring events may exist.

For example, the occurring event types may include an accident on a road, a toll gate fee on highway, a police inspection and the like.

(2) A plurality of events occurring in a mobile station may register with a base station.

In this case, one event identifier (Event ID: EID) may be assigned to each of the events.

3) Events may have the following configurations.

1) Periodicity

One-time occurring event (e.g., a mobile station broadcasts an event occurrence to other mobile stations one time and then automatically performs event deregistration from a base station.).

Certain period interval (e.g., if a certain period interval expires, a mobile station automatically performs deregistration from a base station.)

Persistent event broadcast (e.g., a mobile station sends an event deregistration message to a base station (i.e., event cancellation is explicitly announced to the base station) and then performs event deregistration from the base station.)

2) Event Type Identification

Each event type may have a preamble code for each event in order to enable a base station to promptly recognize a type of an event occurrence.

In this case, a preamble set corresponding to events is broadcasted to mobile stations via network to inform the mobile stations of the preamble set.

FIG. 1 is a flowchart for a method of providing a broadcast service in a system supportive of machine to machine communications according to one embodiment of the present invention.

First of all, a mobile station (MAIN DEVICE) detects that an event has occurred [S101]. In this case, as mentioned in the foregoing description, the event may include one of an emergency, a highway fee payment and the like. In doing so, the mobile station corresponds to a mobile station having an event occur in an M2M communication supportive system and may be named a main device for clarity.

Subsequently, the mobile station enables the event occurrence to register with a base station using an event registration message [S102]. In dong so, the mobile station may also make a resource allocation request for a resource, which is requested to broadcast an event occurrence to other mobile stations, to the base station through the event registration message transmission. And, the mobile station may be able to make a resource allocation request to the base station separately after completion of the event registration. FIG. 1 shows a case that a resource allocation request for broadcasting an event occurrence to other mobile stations is made via an event registration message.

In particular, the event registration message may include at least one of an information indicating the type of the event occurring in the mobile station, a DL resource allocation request information on a DL resource to broadcast the event occurrence to other mobile stations, a signal strength information on a signal used for an event occurrence broadcast, and an event occurrence broadcast period information.

In particular, the information indicating the event type is a preamble code and one preamble code is assigned to each event type.

In this case, the mobile station may be able to receive preamble code set information corresponding to each event from a network, to which the base station belongs, via a broadcast message.

The event type may include one of a one-time event, an event having a certain period, an event occurring persistently and the like.

The event occurrence broadcast period information may mean the information indicating whether the mobile station will transmit the event occurrence to other mobile stations one time, multiple times as many as a count set for a certain interval, or persistently until deregistration of the event occurrence.

The signal strength information may mean a transmission power to transmit the event occurrence to other mobile stations by broadcast.

The mobile station makes an assignment request for a DL resource region of the base station via the event registration message. In this case, the DL resource region is used for a UL resource region for the mobile station to broadcast a fact of the event occurrence to other mobile stations.

In particular, the mobile station may be able to transmit UL data (i.e., the event occurrence) to other mobile stations via the DL resource region of the base station.

In case of receiving the event registration message from the mobile station, the base station reserves a DL resource allocation of the base station to enable the mobile station to transmit an event signal to other mobile stations in response to the DL resource region request made by the mobile station [S103].

The base station transmits information on the reserved DL resource allocation to the mobile station as a message in response to the event registration message.

The base station transmits a superframe, frame or subframe index information indicating a position of the reserved DL resource allocation region to the mobile station.

In order to broadcast the event occurrence of the mobile station to other mobile stations belonging to the base station, the base station announces the reserved DL resource allocation information transmitted to the mobile station, the event information to be transmitted to the mobile station, and information on a strength of the signal for broadcasting the event occurrence to the other mobile stations [S105].

Alternatively, the step S105 may be performed before or after the step S104.

Subsequently, the mobile station broadcasts the event occurrence to the other mobile stations belonging to the base station via the reserved resource allocation region [S106].

In this case, the mobile station may be able to broadcast the event occurrence to other mobile stations via a preamble code, a MAC message, a header (e.g., a superframe header (SFH), etc.) or the like.

And, how the mobile station will transmit the event occurrence to other mobile stations may be determined by the operation performed in the step S102.

Moreover, the broadcast of the event occurrence may be transmitted to other mobile stations one time, by a count set for a certain period of time, or fixedly (or persistently). In particular, the broadcast of the event occurrence may be transmitted to other mobile stations by periods.

Based on the informations received from the base station, the other mobile stations can be aware of the event occurrence transmitted from the main mobile station (MAIN DEVICE) (i.e., the mobile station announcing the event occurrence).

In particular, each of the other mobile stations is able to approximately calculate a distance from an event occurring location via the strength of the received signal, thereby recognizing the event occurrence [S107].

After duration of the condition set by the broadcast (e.g., one time, in a certain period of time, fixedly (or persistently)), the main mobile station performs a procedure for canceling the event registration with the base station.

In doing so, referring to FIG. 1, if the period of broadcasting the event occurrence to other mobile stations is set persistently, in order o perform the event deregistration from the base station, the mobile station sends an event deregistration request message to the base station [S108]. In particular, in case that the mobile station performs the event occurrence broadcast persistently, the mobile station cancels the event registration with the base station only if sending the event deregistration message to the base station.

Having received the event deregistration request message from the main mobile station (MAIN DEVICE), the base station cancels the event occurrence registration and also cancels the DL resource allocated for the broadcast [S109].

Thereafter, the base station announces the event occurrence deregistration to other mobile stations by broadcast [S110].

Figure 2:
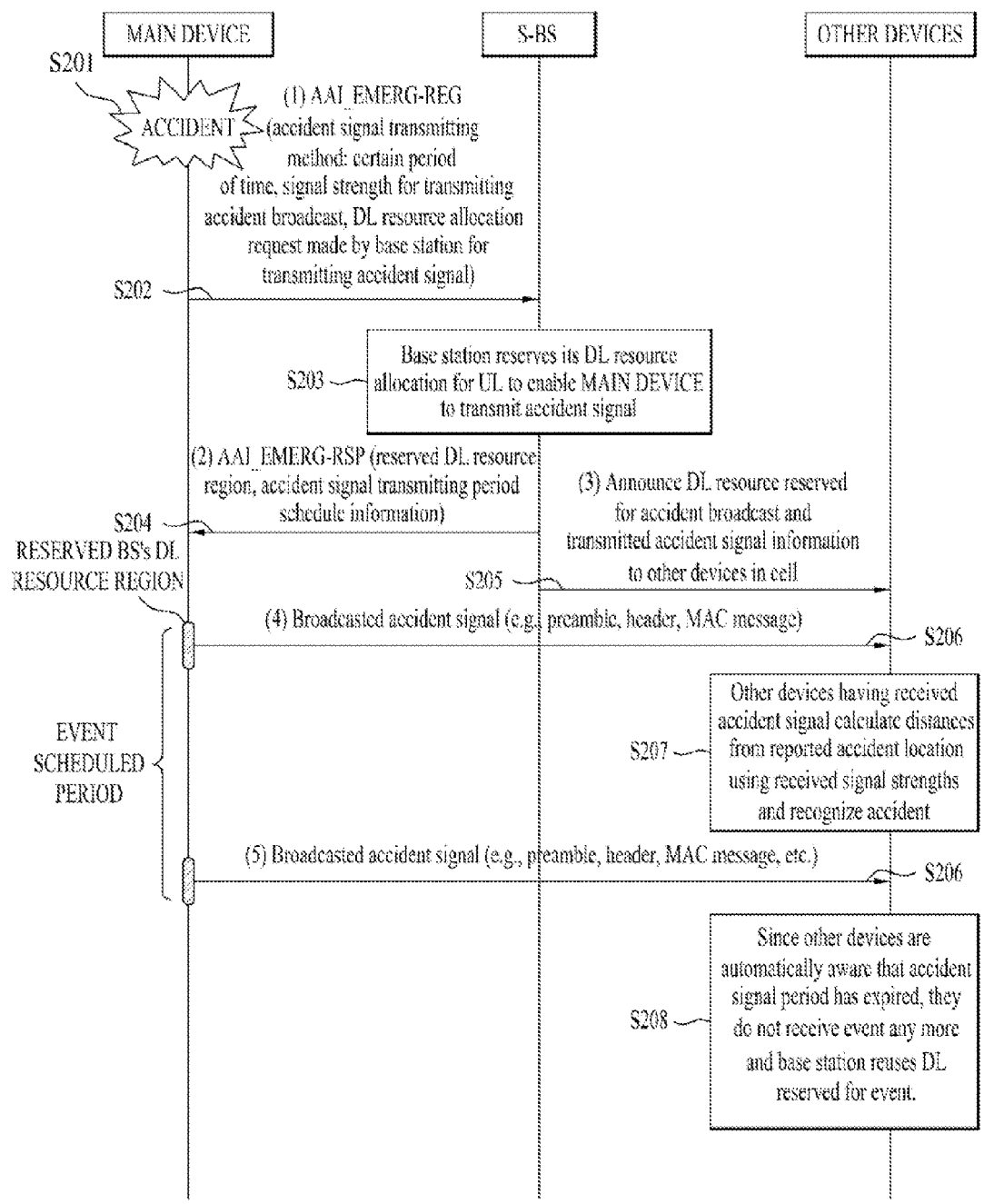
FIG. 2 is a flowchart for a method of providing a broadcast service in a system supportive of machine to machine communications according to another embodiment of the present invention.

FIG. 2 is a flowchart for a method of providing a broadcast service in a system supportive of machine to machine communications according to another embodiment of the present invention.

Unlike FIG. 1, FIG. 2 shows a following method. First of all, a mobile station broadcasts an event occurrence to other mobile stations in a certain period of time and then cancels an event registration with a base station automatically (i.e., without transceiving a deregistration message with the base station).

Since the steps S201 to S207 shown in FIG. 2 are identical to the steps S101 to S107 mentioned with reference to FIG. 1, the description of the same parts shall be omitted but the different parts in-between shall be explained in the following description.

Referring to FIG. 2, when a main mobile station (MAIN DEVICE) (i.e., an event occurring mobile station) sends an event registration message containing an information indicating that an event occurrence broadcast period information is transmitted in a certain interval to a base station, if the main mobile station broadcasts an event occurrence fact to other mobile stations (OTHER DEVICES) for a certain period of time, the event registration of the mobile station is canceled without a procedure for an event deregistration from the base station [S208].

In particular, the base station automatically cancels the event registration with the main mobile station after duration of the certain period of time and is then able to cancel to use a resource region reserved to enable the main mobile station to broadcast the event occurrence.

Figure 3:
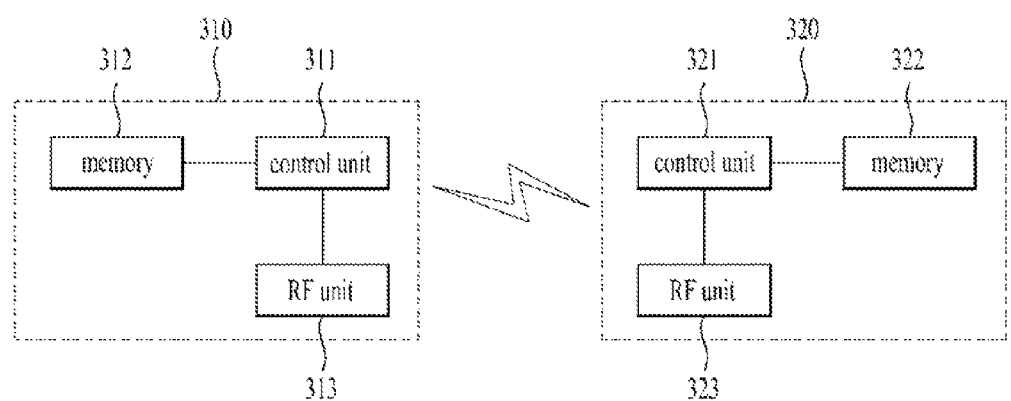
FIG. 3 is an internal block diagram of a mobile station and a base station according to one embodiment of the present invention.

FIG. 3 is an internal block diagram of a mobile station and a base station according to one embodiment of the present invention.

Referring to FIG. 3, a base station 310 may include a control unit 311, a memory 312 and a radio frequency (RF) unit 313.

The control unit 311 implements the proposed functions, processes and/or methods. And, layers of a radio interface protocol may be implemented by the control unit 311.

In order to enable an event occurring mobile station to broadcast an event occurrence to other mobile stations, the control unit 311 controls a DL resource region to be reserved and transmitted to the event occurring mobile station.

The memory 312 is connected with the control unit 311 and then stores protocols and/or parameters for a multicarrier management and operation. The RF unit 313 is connected with the control unit 311 and then transmits and/or receives signals in-between.

A mobile station 320 may include a control unit 321, a memory 322 and a radio frequency (RF) unit 323.

The control unit 321 implements the proposed functions, processes and/or methods. And, layers of a radio interface protocol may be implemented by the control unit 321. The control unit 321 may control UL data burst (i.e., an event occurrence) to be transmitted via a reserved DL resource allocation region of the base station.

The memory 322 is connected with the control unit 321 and then stores protocols and/or parameters for a multicarrier management and operation. The RF unit 323 is connected with the control unit 321 and then transmits and/or receives signals in-between.

The control unit 311/321 may include ASIC (application-specific integrated circuit), a prescribed chipset, a logical circuit and/or a data processor. The memory 312/322 may include ROM (read-only memory), RAM (random access memory), flash memory, memory card, storage medium and/or other storage devices. The RF unit 313/323 may include a baseband circuit configured to process radio signals. In case of the implementation of the embodiments by software, the methods mentioned in the foregoing description can be implemented by modules (e.g., procedures, functions, etc.) for performing the above-explained functions or operations. The module is saved in the memory 312/322 and may be activated by the control unit 311/321. The memory 312/322 may be provided inside or outside the control unit 311/321 and may be connected to the control unit 311/321 by the means well known to the public.

What is claimed is:

1. A method of broadcasting an event occurrence from a mobile station to other mobile stations in a system supportive of M2M (machine to machine) communication, comprising the steps of:
    receiving a preamble code set including preamble codes respectively corresponding to event types from the base station;
    detecting an occurrence of an event;
    sending an event registration message for registering the occurring event to the base station using the preamble code corresponding to the occurring event;
    receiving an event registration response message including an information on a resource region to transmit the occurring event to the other mobile stations; and
    broadcasting the occurring event to the other mobile stations using the resource region information.

2. The method of claim 1, wherein the event registration message comprises at least one selected from the group consisting of a resource region allocation request information to broadcast the event occurrence to the other mobile stations, a signal strength information indicating a signal strength of a transmission power used to broadcast the event occurrence to the other mobile stations, and an event occurrence broadcast period information indicating a count of transmissions for broadcasting the event occurrence to the other mobile stations.

3. The method of claim 2, wherein the event type comprises information indicating a one-time event, an event having a certain period of time or a persistently occurring event.

4. The method of claim 1, further comprising the step of requesting a resource region to transmit the occurring event to the other mobile stations to the base station.

5. The method of claim 2, wherein the event occurrence broadcast period information indicates to broadcast the event occurrence to the other mobile stations one time, for a certain period, or persistently.

6. The method of claim 5, further comprising the step of performing an event deregistration procedure for canceling a registration of the occurring event with the base station.

7. The method of claim 6, wherein if the event occurrence broadcast period information comprises an information indicating to broadcast the event occurrence to the other mobile stations persistently, the registration of the occurring event with the base station is canceled by sending an event deregistration request message to the base station.

8. The method of claim 1, wherein the broadcasting step is performed using at least one selected from the group consisting of a preamble code, a superframe header and a MAC message.

9. The method of claim 1, wherein the resource region information indicates a position of a resource region allocated to broadcast the occurring event to the other mobile stations.

10. The method of claim 9, wherein the information indicating the position of the resource region comprises an index of one selected from the group consisting of a superframe, a frame and a subframe.

11. The method of claim 1, wherein the event comprises one selected from the group consisting of a car accident, a toll gate fee payment on a highway and a police check (inspection).

12. A mobile station, which broadcasts an event occurrence in a system supportive of M2M (machine to machine) communication, comprising;
    a radio communication unit configured to externally transceive radio signals; and
    a control unit connected with the radio communication unit, the control unit controlling the radio communication unit to receive a preamble code set including preamble codes respectively corresponding to event types from the base station, the control unit, if detecting an occurrence of an event, controlling the radio communication unit to send an event registration message for registering the occurring event to the base station using the preamble code corresponding to the occurring event, the control unit controlling the radio communication unit to receive an event registration response message including an information on a resource region to transmit the occurring event to the other mobile stations, the control unit controlling the radio communication unit to broadcast the occurring event to the other mobile stations using the resource region information.

* * * * *